(12) United States Patent
Moore et al.

(10) Patent No.: US 10,093,292 B2
(45) Date of Patent: Oct. 9, 2018

(54) BRAKE SYSTEM AND METHOD FOR OPERATING SAME

(71) Applicant: Ford Global Technologies, LLC, Dearborn, MI (US)

(72) Inventors: Ian Moore, Pulheim (DE); Marie Preusser, Nordrhein-Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 15/058,605

(22) Filed: Mar. 2, 2016

(65) Prior Publication Data

US 2016/0272170 A1   Sep. 22, 2016

(30) Foreign Application Priority Data

Mar. 3, 2015  (DE) ........................ 10 2015 203 737

(51) Int. Cl.
| | |
|---|---|
| *B60T 7/12* | (2006.01) |
| *B60T 8/176* | (2006.01) |
| *B60T 7/22* | (2006.01) |
| *B60T 13/58* | (2006.01) |
| *B60T 13/66* | (2006.01) |
| *B60T 13/68* | (2006.01) |

(52) U.S. Cl.
CPC ............... *B60T 8/176* (2013.01); *B60T 7/22* (2013.01); *B60T 13/588* (2013.01); *B60T 13/662* (2013.01); *B60T 13/686* (2013.01); *B60T 2201/022* (2013.01); *B60T 2201/03* (2013.01)

(58) Field of Classification Search
CPC ... B60T 7/12; B60T 7/22; B60T 8/176; B60T 2270/10; B60T 13/588; B60T 13/686; B60T 13/662; B60T 2201/03; B60T 2201/022
See application file for complete search history.

(56) References Cited

FOREIGN PATENT DOCUMENTS

| | | |
|---|---|---|
| EP | 1172272 A1 | 6/2001 |
| EP | 1745999 A2 | 1/2007 |

*Primary Examiner* — Xuan Lan T Nguyen
(74) *Attorney, Agent, or Firm* — Raymond L. Coppiellie; Burgess Law Office, PLLC

(57) ABSTRACT

A brake system for a motor vehicle including front wheel brakes, rear wheel brakes, and a hydraulic system supplying hydraulic fluid to the wheel brakes. An electronic brake control connected to the hydraulic system actuates the hydraulic system to build up a brake pressure and supply the wheel brakes with the hydraulic fluid. The system includes a parking brake system that activates the rear wheel brakes. The electronic brake control actuates the hydraulic system to build up a brake pressure and at the beginning of an emergency braking procedure closes valves of the hydraulic system associated with the rear wheel brakes, opens valves of the hydraulic system associated with the front wheel brakes, and activates the parking brake system while keeping the valves of the hydraulic system associated with the rear wheel brakes closed for a period of adjustable length.

12 Claims, 3 Drawing Sheets

BRAKE SYSTEM AND METHOD FOR OPERATING SAME

CROSS-REFERENCE TO RELATED APPLICATIONS

Not Applicable.

BACKGROUND OF THE INVENTION

1. Field of the Invention

The invention relates to a vehicle brake system; and more specifically, to a brake system having a service brake system and a parking brake system.

2. Description of Related Art

A motor vehicle generally has two front wheel brakes arranged in the region of a front axle of the motor vehicle and two rear wheel brakes arranged in the region of a rear axle of the motor vehicle. In addition, the motor vehicle may include a hydraulic system supplying the wheel brakes with a hydraulic fluid for the operation thereof. The hydraulic system including electrically actuated valves. The motor vehicle may also include a parking brake system that activates the rear wheel brakes.

The motor vehicle may be equipped with diverse driving assistance systems. In particular, the vehicle may have an emergency brake system, wherein upon detection of a hazardous situation the system conducts autonomous emergency braking of the motor vehicle. The emergency brake assistant system may include an electronic brake control operative to signal the hydraulic system whereby the hydraulic system operates to build hydraulic pressure, for example brake fluid pressure, and supply the wheel brakes with the pressurized hydraulic fluid. The motor vehicle may also include a hill start assist (HSA) system wherein a motor vehicle having manual or automatic transmission shifting and which is standing on an inclined carriageway is temporarily held to prevent inadvertent rolling away of the motor vehicle and to facilitate starting. Such a hill start assist system may include an electrically actuated parking brake system.

Larger and heavier motor vehicles customarily have a brake system of larger dimensions, in particular larger brake cylinders, than smaller and lighter motor vehicles. A greater amount of hydraulic fluid must be fed to the larger brake cylinders than is the case with smaller brake cylinders. Brake pressure generally builds up more slowly with correspondingly larger and heavier motor vehicles than with smaller and lighter motor vehicles. To compensate for this, a hydraulic system of a larger and heavier motor vehicle can be provided with a larger and more powerful fluid pump, but this is associated with weight disadvantages.

SUMMARY OF THE INVENTION

One example of the present invention includes a motor vehicle brake system having front and rear wheel brakes and a hydraulic system including valves, at least one valve associated with the front wheel brakes, and at least one valve associated with the rear wheel brakes, connected to the front and rear wheel brakes. An electronic brake control connected to the hydraulic system actuates the hydraulic system to build up a brake pressure in the front and rear wheel brakes. The system includes a parking brake system connected to the electronic brake control and operative to activate said rear wheel brakes. During a braking procedure, the electronic brake control actuates the hydraulic system to close a valve(s) of the hydraulic system associated with the rear wheel brakes and activates the parking brake system.

A further example includes a method of operating a brake system of a motor vehicle having a hydraulic system for supplying pressure to a front wheel brake and rear wheel brake and a parking brake. The method including supplying pressure to a front wheel brake; activating the parking brake; and withholding pressure to a rear wheel brake.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
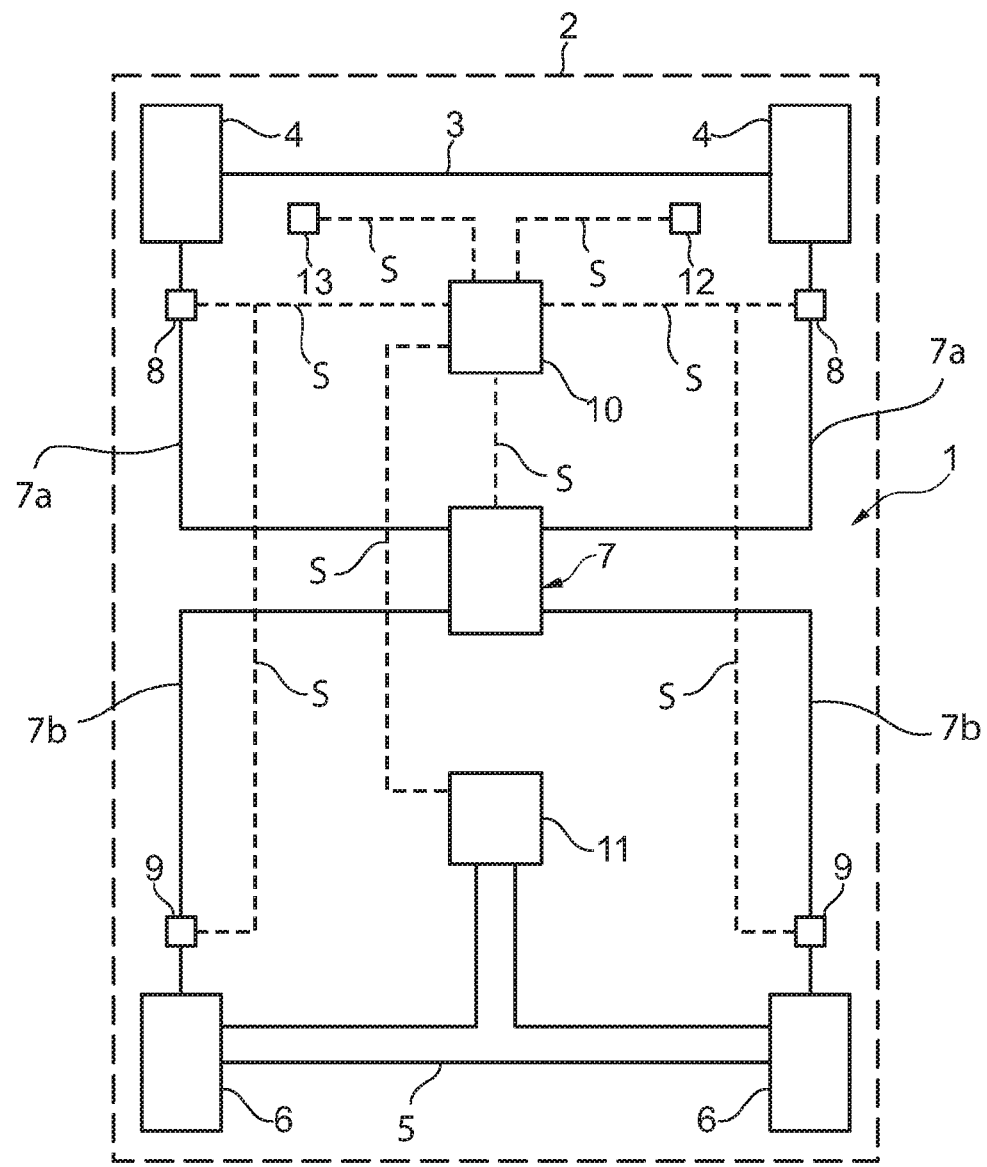
FIG. 1 is a schematic illustration of an exemplary embodiment of a brake system according to the invention.

FIG. 1 shows a schematic illustration of an exemplary embodiment of a brake system, seen generally at 1, for use with a motor vehicle 2. The brake system 1 includes two front wheel brakes 4 arranged in the region of a front axle 3 of the motor vehicle 2 and two rear wheel brakes 6 arranged in the region of a rear axle 5 of the motor vehicle 2. A hydraulic system 7 supplies hydraulic fluid through front supply lines 7a to the front wheel brakes 4 and through rear supply lines 7b to the rear wheel brakes 6 for the operation thereof. An electrically actuated valve 8 is on each front supply line 7a and an electrically actuated valve 9 is on each rear supply line 7b.

The brake system 1 also includes an electrically actuated parking brake system 11 connected to and operative to activate or engage both rear wheel brakes 6.

An electronic brake control 10 connects, via signal lines S, to the hydraulic system 7, the parking brake system, 11, and the electrically actuated valves 8, 9. Upon receiving a signal from the electronic brake control 10 the hydraulic system 7 operates to build up a brake pressure, in the present example a hydraulic or brake fluid pressure, to supply the front and rear wheel brakes 4, 6 with the hydraulic fluid activating or engaging both the front and rear wheel brakes 4, 6.

In the disclosed example, upon receiving a signal to carry out autonomous emergency braking of the motor vehicle 2, initially the electronic brake control 10 actuates the hydraulic system 7 to build up a hydraulic or brake fluid pressure. The electronic brake control 10 sends a signal closing the electrically actuated valve 9 on each rear supply line 7b of the hydraulic system 7 preventing hydraulic or brake pressure fluid from activating or engaging the rear wheel brakes 6. The electronic brake control 10 also sends a signal to open the electrically actuated valve 8 on each front supply line 7a of the hydraulic system 7 enabling hydraulic or brake fluid pressure to activate or engage the front wheel brakes 4. At the same time, the electronic brake control 10 sends a signal to activate the parking brake system 11 and to keep the electrically actuated valve 9 on each rear supply line 7b of the hydraulic system 7 closed for a period of adjustable length. The electronic brake control 10 may also deactivate the parking brake system 11 at the end of the period of adjustable length. The present invention provides a method to rapidly produce a brake force required for carrying out autonomous emergency braking of a motor vehicle. The length of the period the valves 9 of the hydraulic system 7 assigned to the rear wheel brakes 6 are kept closed can be adjusted according to vehicle parameters.

During the period of adjustable length, only the electrically actuated parking brake system 11 is used for braking at least two rear wheels arranged on at least one rear axle 5 of the motor vehicle, and only the hydraulic system is used for braking at least two front wheels arranged on at least one front axle 3 of the motor vehicle. In this manner, the brake cylinders of the front wheel brakes 4 act more rapidly and supply a greater amount of hydraulic fluid whereby a brake force can be produced more rapidly by the front wheel brakes 4. At the same time, the parking brake system 11 produces a brake force more rapidly on the rear wheel brakes 6.

A detection device 12 connected, or connectable via a signal line S for signal transmission, to the electronic brake control 10 detects if at least one wheel (not shown), assigned to a rear wheel brake 6, of the motor vehicle 2 is locking up (ceasing rotation) because of activation of the wheel brake 6 via the parking brake system 11. If the electronic brake control 10 detects a rear wheel, associated with a rear wheel brake 6, locking up (ceasing rotation) due to activation of the parking brake system 11, the electronic brake control 10 deactivates the parking brake system 11 before beginning operation of the front wheel brakes 4 in anti-lock braking system (ABS) mode. At the same time, the electronic brake control 10 opens electrically actuated valves 9 of the hydraulic system 7 supplying hydraulic or brake fluid pressure to the rear wheel brakes 6.

In an additional embodiment, the system 1 detects vehicle load conditions. A sensor unit 13 connected, or connectable via a signal line S for signal transmission, to the electronic brake control 10 detects the weight of the motor vehicle 2 whereby the system determines a vehicle load condition. The vehicle load condition relates to vehicle weight, significant changes in vehicle weight occur depending upon whether the vehicle is lightly or heavily loaded. For example, a commercial vehicle may be fully or partially loaded, or it may be lightly loaded or empty as it nears the end of a route or returns to take on more goods. The electronic brake control 10 compares the detected load condition of the motor vehicle 2 with a predetermined load condition limit value. If the detected load condition of the motor vehicle 2 is lower than a predetermined load condition limit value necessary to carry out autonomous emergency braking of the motor vehicle 2 then at the beginning of the autonomous emergency braking the electronic brake control 10 does not activate the parking brake system 11. Further the electronic brake control 10 opens electrically actuated valves 8, 9 of the hydraulic system 7 supplying hydraulic or brake fluid pressure to the rear wheel brakes 6 and the front wheel brakes 4.

Brake system 1 operates in a normal mode if the respectively detected load condition of the motor vehicle 2 is lower than the load condition limit value. Only if the respectively detected load condition of the motor vehicle 2 is equal to or greater than the load condition limit value are, at the beginning of the autonomous emergency braking, are the valves 9 of the hydraulic system 7 on each rear supply line 7b of the hydraulic system closed. While, at the same time, the parking brake system 11 is activated and those valves 9 of the hydraulic system 7 are kept closed for a period of adjustable length. A lightly loaded motor vehicle 2, the load condition of which is therefore below the load condition limit value, may require driving stabilization from the beginning of the autonomous emergency braking whereby activation of the parking brake system 11 could oppose driving stabilization. The load condition limit value can be determined from empirical data. It can also be statically predetermined or derived from vehicle parameters.

The motor vehicle 2 can have two or more axles 3, 5. In particular, the motor vehicle 2 can have two or more front axles 3 and/or rear axles. Correspondingly, the brake system 1 may have two or more front wheel brakes 4 arranged in the region of one, two or more front axles 3, and two or more rear wheel brakes 6 arranged in the region of one, two or more rear axles 5. In addition, two, four or more wheels can be arranged on an individual axle 3, 5 of the motor vehicle 2. Correspondingly, the brake system 1 may have two, four or more wheel brakes arranged on an axle 3, 5. At least one wheel brake can be designed as a disk brake, drum brake or a combination of disk brake and drum brake.

The hydraulic system 7 can be part of a service brake system of the motor vehicle 2. In addition to the electrically actuated valves 8, 9, the hydraulic system may include at least one hydraulic pump and at least one hydraulic reservoir. The valve assigned to the corresponding wheel brake is opened via the electronic brake control to supply a wheel brake with hydraulic fluid for the operation thereof.

The electronic brake control 10 connected or connectable by cable or wirelessly for signal transmission to the hydraulic system 7 may be arranged separately or integrated into an existing electronic control of the vehicle 2, in particular into part of a driving assistance device. The electronic brake control 10 can electrically actuate the hydraulic system, in particular the hydraulic pump thereof, to build a brake pressure. Furthermore, the electronic brake control 10 can electrically actuate or open the valves of the hydraulic system in such a manner that the wheel brakes are supplied with the hydraulic fluid.

The parking brake system 11, which activates the two rear wheel brakes 6, may be connected to the rear wheel brakes 6 via an electrical cable pull or electrically actuated operating units assigned individually to the individual rear wheel brakes 6 and may have, for example, an electric motor and possibly a transmission. Alternatively, the parking brake system 11 may be configured in such a manner that both the rear wheel brakes 6 and the front wheel brakes 4 are activated thereby. The parking brake system 11 can be connectable by cable, or wirelessly for signal transmission, to the electronic brake control 10.

According to one example, the electronic brake control 10 deactivates the parking brake system 11 at the end of the period of adjustable length. At the same time, the electronic brake control 10 opens the valves 9 of the hydraulic system 7 associated with the rear wheel brakes 6 whereby hydraulic or brake fluid pressure from the hydraulic system 7 acts upon the rear wheel brakes 6 and the rear wheel brakes 6 produce a brake force via the hydraulic system 7. In particular, the electronic brake control 10 can operate the rear wheel brakes 6 in an ABS (Anti-Lock System) mode.

In one example, the brake system 1 includes at least one detection device 12 connected, or is connectable for signal transmission, to the electronic brake control 10. The detection device 12 detects if at least one wheel, assigned to a rear wheel brake 6, of the motor vehicle 2 is locking because of the activation of the wheel brake 6 via the parking brake system 11. If so, the electronic brake control 10 actuates the hydraulic system 7 to operate the front wheel brakes 4 in an ABS mode. The electronic brake control 10, before the beginning of the operation of the front wheel brakes 4 in the ABS mode, deactivates the parking brake system 11 and, at the same time, opens the valves 9 of the hydraulic system 7 on each rear supply line 7b provided for supplying hydraulic or brake fluid pressure to the rear wheel brakes 6. This helps driving stability during autonomous emergency braking.

In one example, the electronic brake control 10 obtains a signal triggering autonomous emergency braking of the motor vehicle, for example, from a camera arranged on the motor vehicle, from a radar sensor, from a LiDAR (Light Detection and Ranging) sensor, from a LaDAR (Laser Detection and Ranging) sensor or the like. After obtaining a triggering signal, the electronic brake control 10 initiates autonomous emergency braking of the motor vehicle 2. Initially, the electronic brake control 10 actuates the hydraulic system 7 to build up a hydraulic or brake fluid pressure required for carrying out the autonomous emergency braking. The electronic brake control 10 further actuates the electrically actuated valves 8, 9 of the hydraulic system 7 whereby at the beginning of the autonomous emergency braking the electrically actuated valves 9 on rear supply lines 7b provided for supplying the rear wheel brakes 6 are closed. Further, the electronic brake control 10 opens the electrically actuated valves 8 of the hydraulic system 7 on the front supply lines 7a provided for supplying the front wheel brakes 4. Doing so enables production of a brake force more rapidly by the front wheel brakes 4. At the same time, the electronic brake control 10 activates the electrically actuated parking brake system 11 to activate the rear wheel brakes 6. The electronic brake control 10 keeps the electrically actuated valves 9 on rear supply lines 7b provided for supplying the rear wheel brakes 6 closed for a period of adjustable length. At the end of the period of adjustable length, the electrically actuated valves 9 on rear supply lines 7b provided for supplying the rear wheel brakes 6 are opened to act upon and supply the rear wheel brakes 6 with hydraulic fluid.

Figure 2:
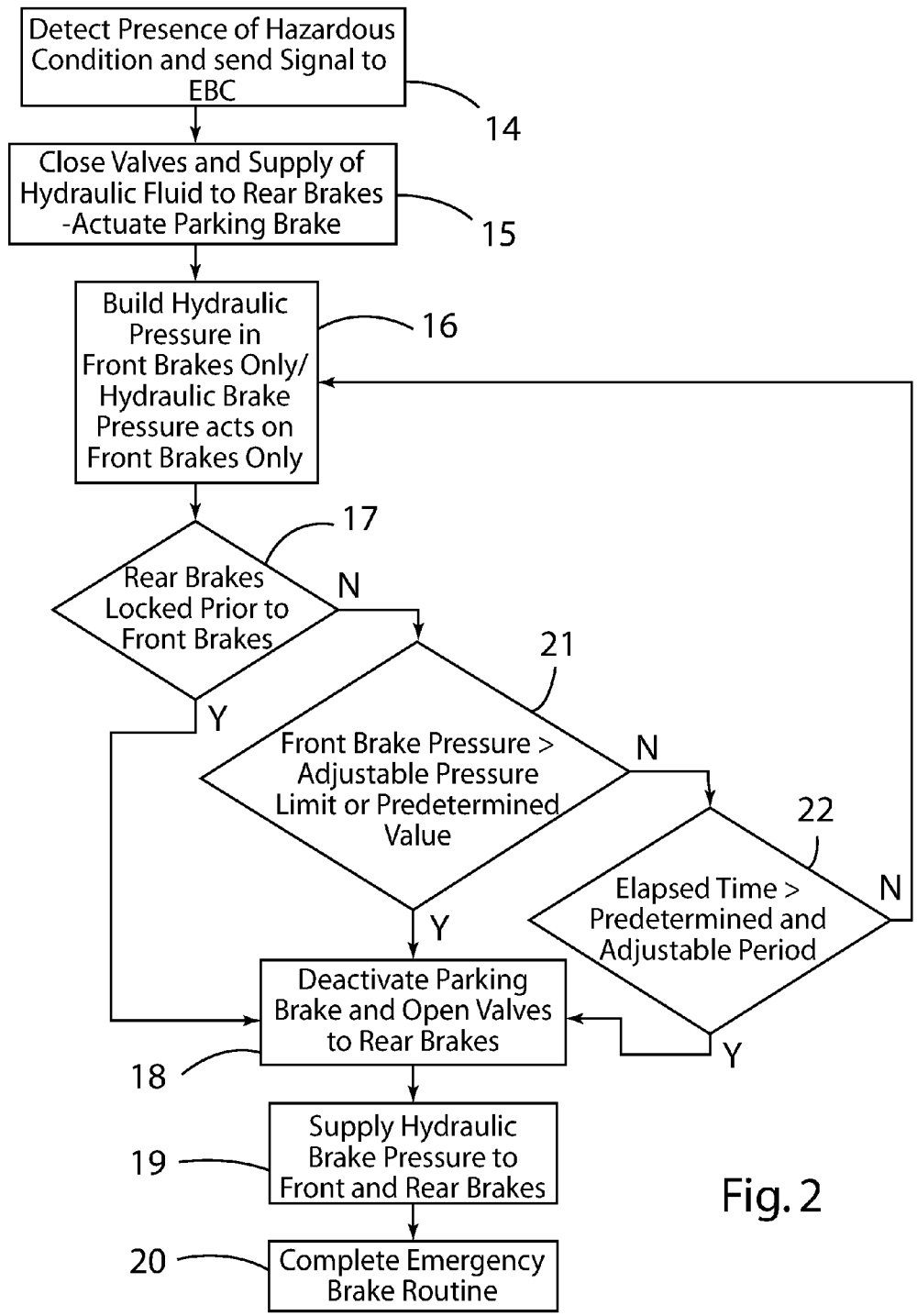
FIG. 2 is a schematic illustration of an exemplary embodiment of a method according to the invention.

FIG. 2 is a schematic illustration of an exemplary embodiment of a method according to the invention for operating the brake system 1. It should be understood that the method may be suitable for other brake systems.

Initially, in step 14, the method, using for example proximity sensors, detects a potentially hazardous situation of the motor vehicle. Upon detecting such a hazardous situation, a corresponding triggering signal is produced and sent to the electronic brake control 10 to activate an autonomous emergency braking system.

In step 15, the electronic brake control 10 actuates the hydraulic system 7 to generate hydraulic or brake fluid pressure. The electronic brake control 10 sends a signal closing the electrically actuated valve 9 on each rear supply line 7b of the hydraulic system 7 preventing hydraulic or brake pressure fluid from activating or engaging the rear wheel brakes 6. The electronic brake control 10 also sends a signal to open the electrically actuated valve 8 on each front supply line 7a of the hydraulic system 7 enabling hydraulic or brake fluid pressure to activate or engage the front wheel brakes 4. At the same time, activates the parking brake system 11, which correspondingly engages the rear wheel brakes 6.

As shown in step 16, hydraulic or brake fluid pressure generated by the hydraulic system 7 acts only on the front wheel brakes 4.

Step 17 checks whether at least one wheel, associated a rear wheel brake 6, of the motor vehicle 2 is locking up (ceasing rotation) because of the activation of the wheel brake 6 via the parking brake system before beginning operation of the front wheel brakes 4 in an ABS mode.

If so, in step 18, the parking brake system 11 is deactivated and, at the same time, the electrically actuated valves 9 of the hydraulic system 7 are opened. Whereby as shown in step 19, the hydraulic system 7 supplies hydraulic or brake fluid pressure to both the front brakes 4 and the rear brakes 6.

In step 20, the autonomous emergency braking of the motor vehicle 2 is continued until the motor vehicle 2 reaches a standstill or until the autonomous braking of the motor vehicle 2 is terminated.

The method according to one example of the present invention moves to step 21 if in step 17 the check indicates no locking up (ceasing rotation) of a wheel assigned to a rear wheel brake 6 because of the activation of the wheel brake 6 via the parking brake system 11 before the beginning of an operation of the front wheel brakes 4 in an ABS mode. Step 21 checks whether the hydraulic or brake fluid pressure built up at the front wheel brakes 4 lies above a predetermined and adjustable pressure limit value or whether the brake pressure has reached a sought value. If so, the method transitions to step 18. If not, the method transitions to step 22.

Step 22 checks whether the electrically actuated valves 9 of the hydraulic system 7 have been closed for a period of time greater than a predetermined and adjustable period. If so, the method transitions to step 18. If not, the method transitions to step 16 wherein the electrically actuated valves 9 of the hydraulic system 7 assigned to the rear wheel brakes 6 remain closed and the parking brake system 11 remains activated.

In addition, the method may include an additional step, for example between steps 14 and 15, detecting a load condition of the motor vehicle. The detected load condition of the motor vehicle can be compared with a predetermined load condition limit value necessary to carry out the autonomous emergency braking of the motor vehicle. If the detected load condition of the motor vehicle is lower than the load condition limit value at the beginning of the autonomous emergency braking electrically actuated valves 8, 9 of the hydraulic system 7 provided for supplying hydraulic or brake fluid pressure to the rear wheel brakes 6 and the front wheel brakes 4 are opened without activating the parking brake system 11.

Figure 3A:
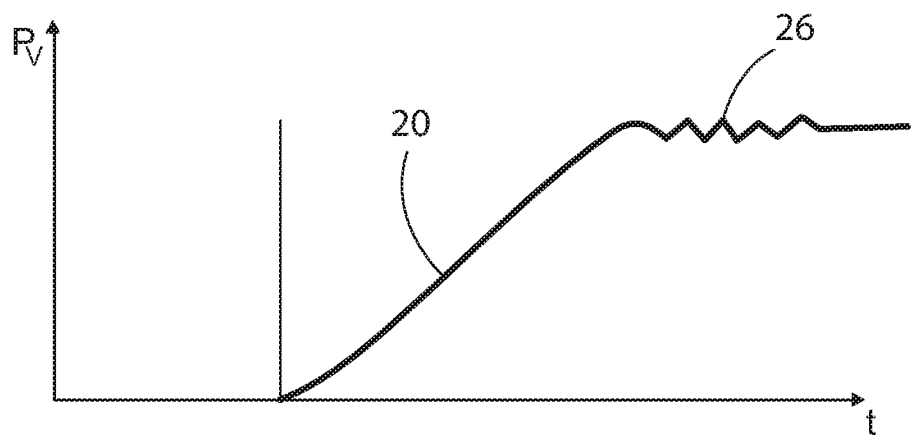
FIGS. 3a and 3b are brake pressure profile diagrams occurring upon carrying out an autonomous emergency braking of a motor vehicle in accordance with an exemplary embodiment of a method according to the invention.
Figure 3B:
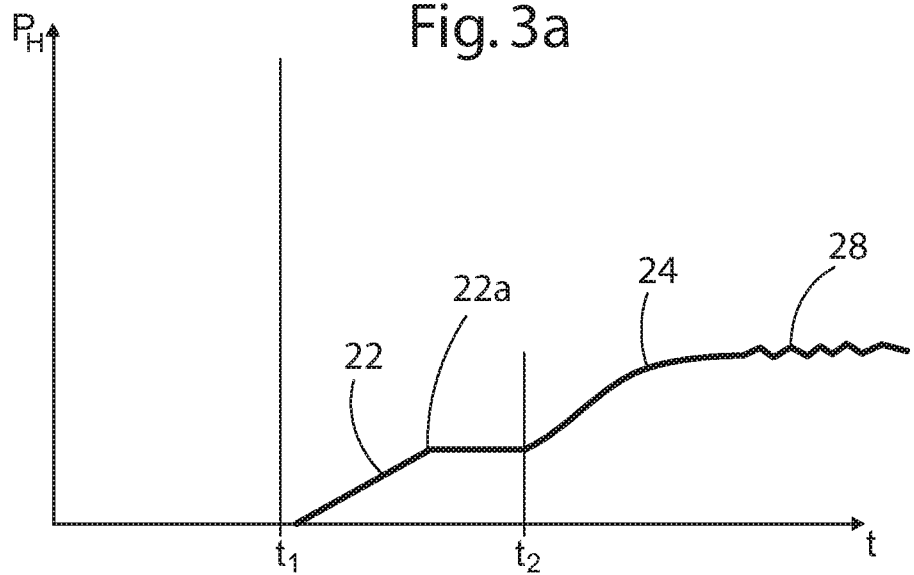

FIGS. 3a and 3b shows brake pressure profile diagrams of brake pressure when carrying out autonomous emergency braking of a motor vehicle in accordance with an exemplary embodiment of a method according to the invention. FIG. 3a shows brake pressure $P_V$ applied to the front wheel brakes 4, and FIG. 3b shows brake pressure $P_H$ to the rear wheel brakes 6 over a period of time t.

At the time $t_1$, the electronic brake control 10 receives a signal triggering autonomous emergency braking of the motor vehicle 2. Initially, actuation of the hydraulic system 7 causes a continuously rising brake pressure $P_V$, see pressure curve 20, at the beginning of the autonomous emergency braking in the front wheel brakes 4 since the valves 8 on front supply lines 7a provided for supplying the front wheel brakes 4 are opened. Because the valves 9 on rear supply lines 7b provided for supplying the rear wheel brakes 6 are closed and, at the same time, the parking brake system 11 is activated a brake pressure $P_H$, see pressure curve 22, is built up at the rear wheel brakes 6 via the parking brake system 11. Because the parking brake system 11 exerts a predetermined, maximum force the pressure curve 22 reaches a knee point 22a and then remains at a constant brake pressure $P_H$.

The valves 9 of the hydraulic system 7 associated with the rear wheel brakes 6 are kept closed for an adjustable period, which ends at the time $t_2$. As set forth above, the parking brake system 11 is deactivated at the end of the period $t_2$ of predetermined length. Further, at the time $t_2$, the valves 9 of the hydraulic system 7 on rear supply lines 7b provided for supplying the rear wheel brakes 6 are opened such that a continuously rising brake pressure $P_H$, see pressure curve 24, builds up at the rear wheel brakes 6 via the hydraulic system.

The brake pressure $P_V$ and $P_H$ build up at both the front wheel brakes 4 and the rear wheel brakes 6 may be controlled by a driving stability assistant of the motor vehicle 2. After the time $t_2$, the hydraulic or brake fluid pressure in both the front wheel brakes 4 and the rear wheel brakes 6 continues to build until both are operated in an ABS mode, see the zigzag-shaped profile of the brake pressure curve 26, 28 illustrating the changes in $P_V$ and $P_H$ respectively, until the motor vehicle 2 is at a standstill or until the autonomous braking of the motor vehicle is terminated.

If activation of the parking brake system 11 causes locking up (ceasing rotation) of at least one wheel, associated with a rear wheel brake 6, of the motor vehicle before the front wheel brakes 4 operate in an ABS mode the parking brake system 11 is deactivated. At the same time, the valves 9 of the hydraulic system 7 associated with the rear wheel brakes 6 are opened.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle brake system comprising:
   front wheel brakes;
   rear wheel brakes;
   a hydraulic system including valves, at least one valve associated with said front wheel brakes and at least one valve associated with said rear wheel brakes, said hydraulic system connected to said front wheel brakes and said rear wheel brakes;
   an electronic brake control connected to the hydraulic system and operable to actuate said hydraulic system to build up a brake pressure in the front wheel and rear wheel brakes;
   a parking brake system connected to said electronic brake control and operative to activate said rear wheel brakes whereby at the beginning of an autonomous emergency braking procedure said electronic brake control actuates the hydraulic system to close the at least one valve associated with the rear wheel brakes, activates the parking brake system, and keeps the at least one valve associated with the rear wheel brakes closed;
   wherein the electronic brake control maintains the at least one valve associated with the rear wheel brakes for a period of adjustable length; and
   deactivates the parking brake system and opens the at least one valve associated with the rear wheel brakes at the end of the period of adjustable length.

2. The brake system of claim 1 including a detection device connected to the electronic brake control detecting if at least one wheel, associated with a rear wheel brake, is locking because of the activation of the parking brake system wherein the electronic brake control actuates the hydraulic system to operate the front and rear wheel brakes in an ABS mode; and
   upon detecting locking of the wheel deactivating the parking brake system before the beginning operation of the front wheel brakes in the ABS mode and opening the valves associated with the rear wheel brakes.

3. The brake system of claim 1 including a sensor unit detecting a load condition of the motor vehicle connected to the electronic brake control wherein brake control unit compares the detected load condition of the motor vehicle with a predetermined load condition limit value and, if the respectively detected load condition of the motor vehicle is lower than the load condition limit value opens the valves of the hydraulic system associated with the front and rear brakes without activating the parking brake system.

4. A method of operating a brake system of a motor vehicle having a hydraulic system providing pressure to a front wheel brake and rear wheel brake and a parking brake system including the steps of:
   carrying out autonomous emergency braking of the motor vehicle by actuating the hydraulic system via an electronic brake control in such a manner that a brake pressure is built up by the hydraulic system, wherein at the beginning of the autonomous emergency braking valves of the hydraulic system associated with the rear wheel brakes are closed and valves of the hydraulic system associated with the front wheel brakes are opened; and
   activating the parking brake system wherein the valves of the hydraulic system associated with the rear wheel brakes are kept closed for a period of adjustable length wherein the parking brake system is deactivated at the end of the period of adjustable length.

5. The method of claim 4 including the step of deactivating the parking brake system before the end of the period of adjustable length by detecting locking of at least one wheel, assigned to a rear wheel brake, based on activation of said wheel brake via the parking brake system; and
   upon detecting locking of at least one wheel, deactivating the parking brake system before operating the front wheel brakes in an ABS mode and opening the valves of the hydraulic system associated with the rear wheel brakes.

6. A method of operating a brake system of a motor vehicle having a hydraulic system providing pressure to a front wheel brake and rear wheel brake and a parking brake system including the steps of:
   carrying out autonomous emergency braking of the motor vehicle by actuating the hydraulic system via an electronic brake control in such a manner that a brake pressure is built up by the hydraulic system, wherein at the beginning of the autonomous emergency braking valves of the hydraulic system associated with the rear wheel brakes are closed and valves of the hydraulic system associated with the front wheel brakes are opened; and
   activating the parking brake system wherein the valves of the hydraulic system associated with the rear wheel brakes are kept closed for a period of adjustable length;
detecting a load condition of the motor vehicle;
comparing the detected load condition of the motor vehicle with a predetermined load condition limit value necessary to carry out autonomous emergency braking of the motor vehicle; and
if the detected load condition of the motor vehicle is lower than the load condition limit value the valves of the hydraulic system associated with the rear wheel brakes and the front wheel brakes are opened without activating the parking brake system.

7. A method of operating a motor vehicle brake system comprising:
providing a hydraulic system for supplying pressure to a front wheel brake and rear wheel brake;
providing a parking brake;
supplying pressure to a front wheel brake;
activating the parking brake;
withholding pressure to the rear wheel brake for a period of adjustable length; and
deactivating the parking brake and supplying pressure to the rear wheel brake after the period of adjustable length has elapsed.

8. The method of claim 7 including the step of monitoring the pressure supplied to the front wheel brake; and
deactivating the parking brake and supplying pressure to the rear wheel brake when the pressure supplied to the front wheel brake exceeds a predetermined value.

9. The method of claim 7 including the step of detecting whether a rear wheel associated with a rear wheel brake is locked prior to a front wheel associated with a front wheel brake; and
deactivating the parking brake and supplying pressure to the rear wheel brake when a rear wheel associated with a rear wheel brake is locked prior to a front wheel associated with a front wheel brake.

10. The method of claim 7 including the step of deactivating the parking brake system before operating the front wheel brakes in an ABS mode.

11. The method of claim 7 wherein the step of withholding pressure to a rear wheel brake correspondingly decreases the time to attain a predetermined brake pressure in the front wheel brake.

12. A method of operating a motor vehicle brake system comprising:
providing a hydraulic system for supplying pressure to a front wheel brake and rear wheel brake;
providing a parking brake;
supplying pressure to a front wheel brake;
activating the parking brake;
withholding pressure to a rear wheel brake;
detecting a load condition of the motor vehicle;
comparing the detected load condition of the motor vehicle with a predetermined load condition limit value;
if the detected load condition of the motor vehicle is lower than the load condition limit value skipping the steps of activating the parking brake and withholding pressure to the rear wheel brake; and
supplying pressure to the rear wheel brake.

* * * * *